United States Patent [19]
Klass et al.

[11] 3,818,679
[45] June 25, 1974

[54] SEPARATION OF GASEOUS MIXTURES UNDER NON-STEADY STATE CONDITIONS

[75] Inventors: Donald L. Klass, Barrington; Carl D. Landahl, Chicago, both of Ill.

[73] Assignee: Institute of Gas Technology, Chicago, Ill.

[22] Filed: Feb. 12, 1973

[21] Appl. No.: 331,829

Related U.S. Application Data

[63] Continuation-in-part of Ser. No. 135,091, April 19, 1971, abandoned.

[52] U.S. Cl. .................................................. 55/16
[51] Int. Cl. ............................................. B01d 53/22
[58] Field of Search ......................... 55/16, 73, 158

[56] References Cited
UNITED STATES PATENTS

| 3,350,844 | 11/1967 | Robb | 55/16 |
| 3,398,504 | 8/1968 | Rubin | 55/16 |
| 3,405,508 | 10/1968 | Peters et al. | 55/73 |
| 3,498,026 | 3/1970 | Messinger et al. | 55/73 |

*Primary Examiner*—Charles N. Hart

[57] ABSTRACT

A gas mixture is separated into enriched components under non-steady state conditions wherein a gas in a mixture is more favorably collected by a membrane through adsorption, permeation or both, before the composition of such collected gas reaches substantially constant levels.

4 Claims, 5 Drawing Figures

PATENTED JUN 25 1974　　　　　　　　　　　　　3,818,679

INVENTORS
Donald Leroy JKlass
Carl David Landahl
BY
Dominik, Knechtel & Godula
ATTYS.

SEPARATION OF GASEOUS MIXTURES UNDER NON-STEADY STATE CONDITIONS

This application is a continuation-in-part of copending application Ser. No. 135,091, filed Apr. 19, 1971 and now abandoned.

This invention relates to a method for separating gas components in a mixture into enriched fractions by utilizing a gas permeable membrane under non-steady state conditions. In one form, the invention relates to a method for obtaining enriched fractions by moving a gas permeable membrane from a sorption zone to a desorption zone at controlled velocities so that a high permeability gas component is preferentially picked up in the sorption zone, and released in the desportion zone. The invention also related to apparatus for carrying out such a method.

The art has come to recognize the utility of employing gas permeable membranes for separating components in a gas mixture. According to prevailing views, permeability of a gas through a membrane is characterized by two features, solubility of the gas in the membrane material and diffusion of the gas through a membrane. Permeation of any single gas has therefore been viewed as being the product of the solubility and diffusivity of a given gas in the membrane. Each gas has a particular permeability constant for a given membrane. The rate of permeation of a gas is further influenced by variables such as membrane thickness, nature of the membrane, layers of the membrane involved, differential pressures, temperatures, and possibly still other factors. Such features of membrane technology are recognized in the art, and it is further recognized how such variables may be considered to evaluate the performance of a particular gas and a particular membrane.

Placing gas permeable membranes between separating zones or areas is known for batch separation, or the like, of the gas components. A feed gas mixture is introduced in the zone to one side of the membrane so that high permeability gas components permeate the membrane and pass into the zone on the other side of the membrane. The rejected or non-permeated gas in the first zone may then be drawn off continuously and collected by conventional means. The gas which has completed permeation into the second zone may be drawn off continually and collected by conventional means. When the concentration composition of the gases in the first and second zones no longer changes with time, a steady state condition prevails.

One representative teaching of separating gas components by employing such membranes is disclosed in U.S. Pat. No. 3,172,741; and an improved application of that teaching is disclosed and claimed by the present applicants in copending U.S. patent application, Ser. No. 26,129, filed Apr. 6, 1970, title whereof is also held by the present assignee. One of the features of the present invention is the recognition that conventional separation of gas components was a gas permeable membrane has limitations which detract from the efficiency of such separation. Such a recognition has resulted in the present invention which utilizes the non-steady state of the gas permeable membrane to improve the efficiency of obtaining enriched fractions or components from a gas mixture, relative to known batch or steady state systems where the composition of the gas attains steady levels.

It is accordingly one important object of the present invention to provide a method and apparatus for an improved separation of gas components from a mixture by providing a nonsteady state for a gas permeable membrane to facilitate the separation of the gas components.

It is still another important object of the present invention to provide a method whereby a gas permeable membrane may be moved at selected and variable velocities between adjoining zones to attain efficient pickup of a high permeability gas from a mixture in one place, and to provide efficient release of said carried gas in another place.

Still yet another important object of the present invention is to provide a method wherein a gas permeable membrane may be moved in different ways at selected variable or constant velocities in a first zone where a high permeability gas for that membrane is picked up, and in a second zone wherein the gas is discharged for collection.

Still yet another important object of the present invention is to provide a method wherein a nonsteady state gas permeable membrane is used to efficiently separate different components in a gas mixture by preferentially picking up one component in a sorption zone, collecting the rejected component, and thereafter discharging said picked-up component for collection in a desorption zone.

The foregoing objects are attained together with still other objects which will occur to practitioners from time to time by considering the invention of the following disclosure.

Briefly, gas permeable membranes are selected with known parameters for selectively adsorbing a known gas which is a high permeability gas for that membrane relative to lower permeability gas components which may also be present in the mixture. The concentration composition of the gas adsorbed by or permeated through the membrane is determined prior to reaching steady state levels. In one form, a feed gas mixture is pulsed at selected time intervals and the amount of gas adsorbed or permeated is determined. In another form, a membrane is saturated with a gas mixture and then desorbed so that separately desorbed gases are collected over measured time periods. In still another form a membrane is moved or exposed for a selected time period in a sorption zone where the gas feed mixture is introduced. The membrane is retained in that zone or is moved at a velocity selected to retain the membrane in that zone for a time sufficient to selectively adsorb the high permeability component in the mixture. The membrane is then moved in a desorption zone at selected speeds where the adsorbed gas component is efficiently collected. The movement of the membrane is therefore controlled to permit as high a separation as possible of an adsorbed gas component. Particular speeds will lead to high amounts of adsorption in a given set of conditions and this can be ascertained by noting the amount of component which has been adsorbed and later collected.

Reference will be made to the gas being adsorbed on the gas permeable membrane, and this term may be viewed as meaning that the adsorbed gas is collected on the membrane or permeates the membrane, either partially or completely. As stated, this permeation may be considered as being the product of the solubility and diffusivity of a given gas in a given membrane. It should be understood that when reference is made to the gas permeable membrane carrying or picking up the gas, description of the same dynamic function is intended. It will be appreciated that such terms are also intended to cover any other functions of membrane operation or theory which are unknown or not well understood. In any event, a "high permeability" gas is one which is preferentially picked up by such a gas membrane in the sorption zone for a given membrane velocity. It is understood that both adsorption and permeation through the membrane may occur. The term "collection" is intended to represent obtaining an enriched component whether rejected or adsorbed. Reference to collecting a "permeated" component is intended to refer to a component adsorbed on the membrane, permeated into the membrane or permeated through the membrane.

The known steady-state system provides that a particular membrane will adsorb or permeate a particular concentration composition of a gas mixture at a certain time which is then unchanged. These are the steady-state levels. In accordance with the present invention, the concentration of the gas composition is recorded over a time period prior to attainment of such a steady state. This non-steady state occurs because of relative movement between the memebrane and the gas mixture prior to steady state adsorption or permeation. Movement can be attained in various ways. For example, pulsing a gas mixture so separate charges are delivered to a membrane and determining the amount of gas adsorbed or permeated after one charge, and after successive charges until a steady state is reached. Readings can be obtained from a given membrane after, say, one, three, five and nine charges, assuming a steady state after nine charges. The determination for the steady state is, therefore, made after nine successive charges.

In a similar way, a particular membrane may be saturated with a given gas mixture, and such membrane deposited in a chamber which is depressurized so that a first charge is desorbed at a first time interval. The desorbed gas is collected and a succeeding charge is desorbed at a second time interval an collected. This is continued until all of the adsorbed gas mixture is desorbed. This is a reverse way of reaching the steady state values which correspond to the membrane originally saturated with the gas mixture.

Another way is the presently contemplated preferred embodiment of moving a membrane through a sorption zone and a following desorption zone. Changing the velocity represents altering the adsorption or permeation rates. At such conditions. The concentration composition of the carried gas mixture will be dependent upon the velocity.

In all of the above procedures, an improved separation is realized because gas is preferentially picked up during the relative movement under non-steady state conditions. To further illustrate the differences in these two processes, consideration may be given to a gas mixture A and B having diffusion coefficients $D_A$ and $D_B$, and solubility coefficients $S_A$ and $S_B$ in membrane X. The permeability constants for gases A and B are then given by:

$$P_A = D_A S_A$$

and $$P_B = D_B S_B$$

The separation factors for gas A with respect to gas B is given by:

$$A/B = P_A/P_B = D_A S_A/D_B S_B$$

These parameters are measured by conventional techniques. Depending on the properties of the gas-membrane combination, the separation factor ranges from less than 1.0 to more than 1.0. Particular values provide one skilled in the art with the expected compositions of the permeated gas under steadystate conditions. For the case where gas A and gas B have equal permeabilities for membrane X, permeation of gas mixture A-B through membrane X affords the same gas mixture A-B without enrichment of either component at the steady state condition. Any result which deviates from this occurs under a non-steady state condition.

The present non-steady state process and apparatus may be employed to separate a variety of components which make up different mixtures. Alkane hydrocarbon gases such as methane, ethane, propane, or the like, may be in admixture with other gases such as helium, hydrogen, nitrogen, and still others. Likewise, various mixtures with non-hydrocarbon gases may be subjected to the instant non-steady state separation, such mixtures containing representative gases such as hydrogen, helium, nitrogen, or still others.

The mixture will generally contain two components, one of which generally comprises a major porportion of the mixture. The other component comprising a minor proportion may be present in trace amounts, say, less than 2 percent of the mixture. Such trace amounts are often desirably separated because they may be present as a contaminant, for example, small amounts of helium, nitrogen or hydrogen in natural gas. It is intended however, that mixtures with more than two components may be employed, and that such components may be present in substantial proportions, including a two component mixture, each present up to 50 percent by volume. The steps of adsorption and desorption may occur on the same side of gas permeable membrane as it moves through the respective zones. There may also be present a "through membrane" desorption following permeation of a gas component to the other side of the membrane. In such a case, a desorption zone is present adjacent the moving membrane. In the event desorption occurs only on one side of the membrane, then it is desirable to provide large surface areas of the membrane to permit more efficient adsorption and desorption. Maximal surface areas will be provided, in such a case, in accordance with accommodations of a particular process and apparatus system.

The various ancillary features may be provided to enhance the functions of adsorption and desorption. For example, compression means, such as rollers may be used against the membrane to facilitate collection of the gas in the desorption zone. Negative pressures may be provided in the sorption zone to facilitate adsorption by the mixture introduced under positive pressure. Several membrane systems may be simultaneously operated to selectively adsorb and desorb different gas components from a single feed mixture. Other features will occur to practitioners.

A variety of known membranes are available for use in the gas permeable membrane system. They include cellulosics, such as regenerated cellulose, polyethylene and derivatives, polystyrene and derivatives, silicone rubbers, natural rubbers, polyacrylonitriles, vinyl type membranes, such as polyvinyl fluoride, fluoronated ethylene membranes such as the Teflons, and still others, In general, the gas permeable membrane in the system is preferred to be relatively thin, say, less than about 1 mil thick, although separation according to this invention may still be carried out with thicker membranes, say, up to about 10 mils.

The gas permeable membrane system may take various forms in its movement along the sorption and desorption zones. Such forms may include an endless belt, a rotating disc or sheet, a reciprocating bed-type membrane, or the like. It is intended that the desorption step may occur in one desorption zone or in a series of adjoining desorption zones to attain multiple diffusion in stages. In general, it is preferred that adsorption occurs in one zone or area and desorption occurs in one or more adjoining zones or area. The method and apparatus is susceptible to upgrading gas components by the batch method, a continuous method or a semi-continuous method. This will be further appreciated by consideration of the description in association with the drawings. It is also intended that the rejected gas in the sorption zone may be recycled to the same or to another adsorption zone for further preferential adsorption of the high permeability gas component. Such recycling will even further upgrade the rejected gas component. It is also intended that the carried gas which has completed permeation in the desorption zone may be recycled to further upgrade such carried gas in the same or another adsorption zone.

The flow rate of the high permeability gas through a particular membrane may be ascertained by determining the permeability constant K for a particular membrane system and permeate in accordance with method such as the solubility-diffusivity or constant volume-constant pressure method, both described in the identified copending application, Ser. No. 26,129. Knowing the permeability constant and other parameters, the flow rates of two gases in a mixture may then be considered as a ratio to obtain expressions of separation. It will be appreciated that for a given gas mixture, membrane systems will be selected which provide higher separation.

The following examples illustrate improved separation under non-steady state conditions. They show the improved separation of a gas mixture by utilizing the non-steady state of adsorption or permeation by a semi-gas permeable membrane. Such examples illustrate that the separation factor is increased many times if the gas carried by the membrane is desorbed prior to a time when the adsorped or permeated gas reaches a steady state where its composition is substantially unchanged over continuing time periods.

EXAMPLE 1

Separation of Methane and Nitrogen by Non-Steady State Desorption of Steady State Saturated Membrane A polyacrylonitrile membrane was saturated with a mixture of 18 percent nitrogen and 82 percent methane. The total amount of gas mixture that could be adsorbed by the membrane was adsorbed, therefore, the composition of the adsorbed mixture had reached a steady-state wherein the components of the mixture were unchanged in the membrane. The saturated membrane was placed in a gas tight chamber, the pressure within the chamber was reduced to allow a first sample of gas to desorb from the membrane. At a given time, the desorbed gas was collected to evacuate the chamber of the gas samples. The pressure was again reduced and a second sample was desorbed and collected at a second time period. This procedure was repeated until essentially no further gas is desorbed. Before the permeated gas is depleted, the compositions of the permeated or desorbed gases at different times are determined to establish separation factors under non-steady state conditions. This example is similar to one where the permeated or desorbed gas samples would be alternatively collected by moving the membrane into separate receivers as a function of time. The data obtained under the foregoing nonsteady state separation was compared with steady-state separation data obtained by delivering a feed mixture at relatively constant pressure to one side of a membrane of the same type and thickness, and determining the separation when the permeated gas on the other side of the membrane reached a substantially constant composition.

TABLE 1

|  | Steady-State | | Non-Steady-State | |
| --- | --- | --- | --- | --- |
|  | $N_2$ | $CH_4$ | $N_2$ | $CH_4$ |
| Feed Gas Composition, % | 18 |  | 82 | 18 | 82 |
| Pressure, cm Hg |  | 285 |  | 2950 |  |
| Permeated Gas Composition, % | 68 |  | 32 | 85 | 15 |
| Time elapsed, hr | — |  |  | 0.2 |  |
| Ratio, $N_2:CH_4$ |  | 2.1 |  | 6 |  |
| Separation Factor $N_2/CH_4$ |  | 10 |  | 26 |  |

*At ambient temperature
Based on data extrapolated to evacuation time, average composition during specified time interval, Data Book G2069, p. 13.

It is seen from foregoing Table 1 that the initial period exhibits an extremely high nitrogen to methane separation factor in the non-steady state. This early high nitrogen separation is utilized to advantage by separately collecting such early permeated nitrogen content from subsequently permeated gas mixtures which contain greater amounts of methane.

The separation factor is an expression obtained from:

$$\frac{\% \text{ N in permeated gas} \times \% \text{ CH}_4 \text{ in feed gas}}{\% \text{ CH}_4 \text{ in permeated gas} \times \times \% \text{ N in feed gas}}$$

EXAMPLE 2

Separation of Methane and Propane By Non-Steady State Permeation through a Membrane A feed gas mixture containing 0.17 percent propane about 89.4 percent methane, plus other components, was delivered to one side of a degased anistropic cellulose acetate (Type B) membrane produced by Environgenics Company of California. A pressure difference of 100 psi was used across the membrane at a temperature of 74°C. The gas permeated through the membrane to the low pressure side of the membrane which was about 1 psi The permeated gas samples were analyzed for methane and propane by gas chromatography as a function of time until a steady-state condition was achieved where the composition of the permeated gas was substantially unchanged with time. The results are presented in the following Table 2.

TABLE 2

| Time from start-up, hr. | Percent of steady state value in permeated gas | | Ratio of percentage of (CH₄/Propane) in permeated gas |
| --- | --- | --- | --- |
| | CH₄ | Propane | |
| 0 | 0 | 0 | — |
| 0.5 | 54 | ~0.01 | 5400 |
| 1.5 | 95 | <0.01 | 950 |
| 20.1 | 100 | 100 | 490 |

The data in the above table clearly shows that the non-steady state conditions favors the permeation of methane to facilitate separation of that gas from a mixture of propane and methane. It is seen, for example, that essentially only methane is permeated at the 0.5 hr time interval. Separation and collection of the methane at this non-steady state time period will lead to improved separation of methane from the mixture of methane and propane. It is further seen that even at the 1.5 hr time period there is improved separation of methane as compared to steady state condition at 20.1 hr.

For a further understanding of the invention, reference will now be made to the following highly disgrammatic drawings, wherein.

Figure 1:
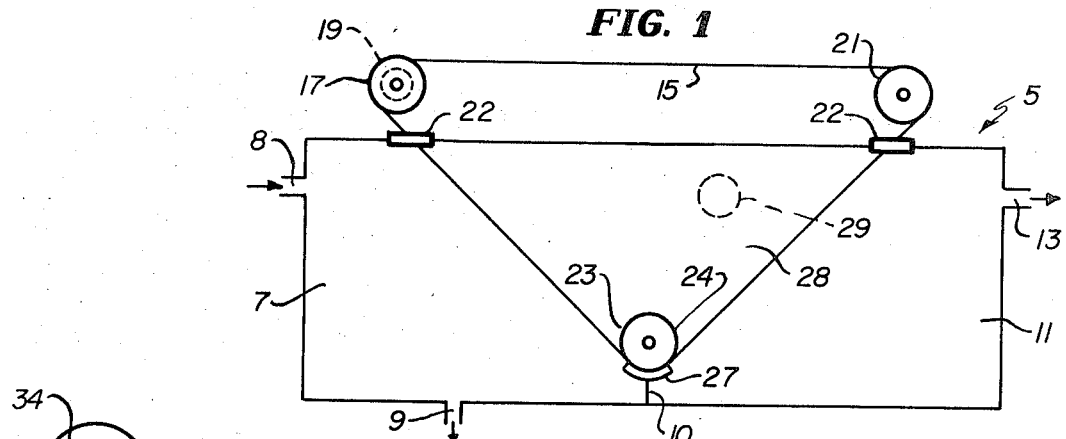
FIG. 1 is a diagrammatic representation of a gas separation enclosure wherein the gas permeable membrane system moves as an endless or continuous run.

The gas separating enclosure 5 of FIG. 1 has an enclosed sorption zone 7 provided with a feed gas mixture inlet 8 and a rejected gas component outlet 9. A support or wall 10 partly separates the sorption zone 7 from the adjoining enclosed desorption zone 11. The desorption zone is provided with a gas discharge 13 through which the released or desorbed gas component passes for collection into means not shown.

The gas permeable membrane system is shown as a continuous or endless membrane film or belt, 15. The membrane film is driven by a variable speed driving roller 17 which may be actuated by a motor assembly indicated at 19. The membrane film turns around an idler roller 21 outside the separating enclosure, and said film is shown passing through passageway plugs or seals 22. Such plugs may have close tolerance passageways to allow movement of the membrane film, but to counteract substantial escape of gases within the enclosed zone. The membrane film also turns around a transitional zone roller 23 which rotates around shaft 24 that may be variously mounted to the chamber. A close tolerance arcuate bearing member 27 is shown positioned below the roller so the membrane film may pass therebetween.

The motor and control means 19 move the membrane film 15 at a predetermined velocity so that the run of the film 15 within the sorption zone 7 is desirably saturated with a high permeability gas component in the mixture present herein. The same or variable speed is employed so that the run of film moving through the desorption zone 11 permits completion of desorption or escape of the carried gas component. Any carried gas component which permeates through the film 15 may be collected through discharge 29 in an ancillary desorption zone 28 formed by the run of the film and the walls of the gas separating enclosure 5. Means such as the illustrated sealing plugs may be used in the walls to assure separation of the respective zones. Whether desorption or through permeation occurs alone or together will depend on the thickness of the film used and other characteristics of the gas-film relationship, for example, permeation.

Figure 2:
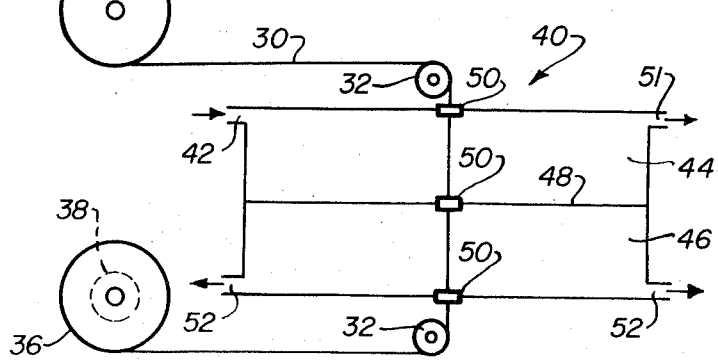
FIG. 2 is a diagrammatic representation of an alternative embodiment wherein the gas permeable membrane system is fed from a supply source and taken up by collecting source, both sources positioned outside the gas separating enclosure.

If it is desired that a run of membrane film be not recycled following desorption, an embodiment such as that shown in FIG. 2 may be employed. The membrane run 30 is shown turning about idler rollers 32, both positioned outside the sorption and desorption zones. The membrane run 30 goes from a supply or feed roller, and is taken up by a collecting source or uptake roll 36, both also positioned outside sorption and desorption zones. The uptake roll is shown as having a variable speed motor 38 mounted thereto to control the velocity of the membrane run through the respective sorption and desorption zones.

The gas separating enclosure 40 is provided with a feed gas mixture inlet 42 leading to sorption zone 44. An underlying desorption zone 46 is separated from the sorption zone by a zone divider or wall 48. Close tolerance passageway plugs or seals 50 are provided in the path of the membrane run. An outlet 51 for the rejected gas component is provided in the sorption zone, said rejected gas moving around opposite sides of the film, which has a width less than that of the sorption zone. Discharges 52 are provided in the desorption zone, through which the carried or permeated gas passes for collection.

Figure 3:
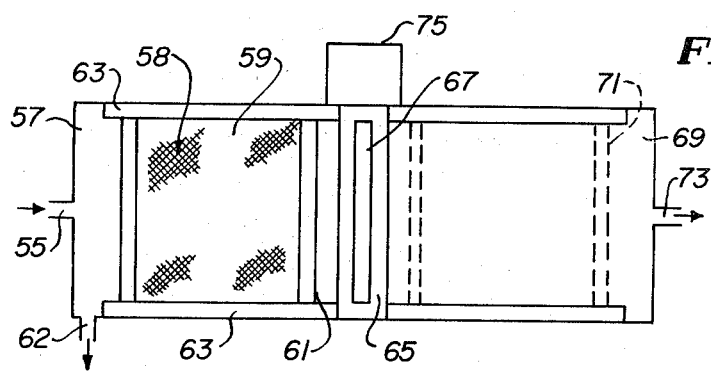
FIG. 3 is a diagrammatic representation of an alternative embodiment wherein the gas permeable membrane system is shuttled reciprocally between adjoining sorption and desorption zones.

A reciprocating gas membrane system is illustrated in the view of FIG. 3. The gas separating enclosure is provided with a feed gas mixture inlet 55 which admits the gas into a sorption zone 57. The gas permeable membrane system 58 is shown as comprising a membrane sheet 59 held in a support frame 61. The membrane system 58 absorbs the high permeability gas component in the sorption zone, and the rejected gas is collected through outlet 62.

The supported membrane 58 is reciprocally supported on track or guide 63. The supported gas membrane system is movable through a divider bulkhead 65 which has a passageway that is opened and closed by a closure member 67. Such closure member may be actuated to move up and down in the form of a guillotine door to open and close the passageway (not shown).

The supported gas membrane system is then moved into the adjoining desorption zone 69, and the position of the membrane system is indicated by 71 in phantom. The desorption zone is provided with a discharge 73 for the permeated or discharge gas component. A control and motive means 75 is shown mounted on the gas separating enclosure and such means move the supported gas permeable membrane system at a predetermined velocity, as well as pausing the membrane system in the respective zones or chambers for predetermined time periods.

Figure 4:
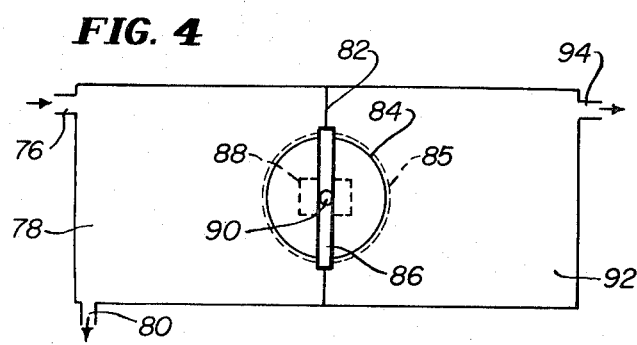
FIG. 4 is a diagrammatic representation of an alternative embodiment wherein the gas permeable membrane system is a rotatable member mounted between adjoining sorption and desorption zones.

A gas permeable membrane system is rotatably mounted so that a point thereon is cyclically moved between adjacent sorption and desorption zones or chambers, as illustrated in the view of FIG. 4. The gas separating enclosure is provided with the feed gas mixture inlet 76 for introducing the feed gas into a sorption zone 78, said zone being provided with a rejected gas outlet 80. A divider wall 82 has rotatably mounted thereon a gas permeable membrane system disc 84, and such disc is held by a disc support indicated by circular dotted line 85. The disc 84 and support 85 rotatably pass through a passageway member 86 which is mounted on the divider wall. The member 86 has a close tolerance passageway to accommodate the disc and support member, and to substantially prevent movement of gas between the adjoining zones or chambers.

A variable speed motor 88 is mounted to the gas separating enclosure, and such motor has a rotating shaft to which is keyed the disc 84 and support 85. It will be seen that a point of the disc moves at predetermined velocities from the sorption zone 78 into the adjoining desorption zone 92 where the carried gas component moves through discharge 94.

Figure 5:
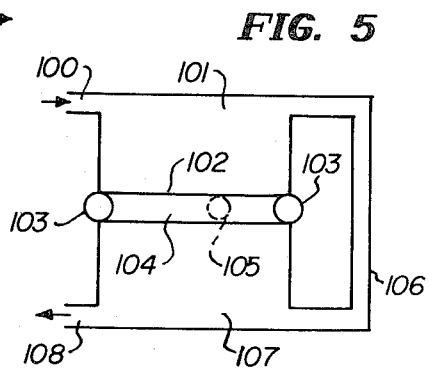
FIG. 5 is a diagrammatic representation of an alternative embodiment wherein the adsorbed gas may permeate through a membrane into an adjoining desorption zone.

The apparatus of FIG. 5 may be employed to collect enriched gas component which substantially permeates through a membrane. A mixture is introduced through inlet 100 and contacts endless membrane 102 turning around rollers 103. The selected speed of the belt preferentially adsorbs high amounts of one component, and the amount of component which is carried by the membrane can then permeate through membrane 102 into a desorption zone 104 which is inside the periphery of the endless membrane. The permeated component may then be collected as an enriched stream through a discharge such as 105 shown in dotted line.

The illustrated embodiment includes a communicating line 106 through which rejected gas mixture passes into a second sorption zone 107. The mixture is again contacted by the moving membrane so that a component may be preferentially adsorbed thereon in accordance with the velocity selected to attain highest amounts of adsroption under non-steady-state conditions. The rejected enriched component may be collected from outlet 108.

The claims of the invention are now presented.

What is claimed is:

1. A method for separating a gas mixture into enriched components, including delivering a feed gas mixture into an enclosed sorption zone wherein a gas permeable membrane system is positioned, and wherein a high permeability gas component from said mixture may be selectively carried by said gas permeable membrane under a non-steady state condition, effecting relative movement between the gas permeable membrane and the feed gas mixture to allow said high permeability gas component to preferentially move onto said gas permeable membrane relative to another gas component of lower permeability in said mixture during non-steady-state condition, which corresponds to a time period prior to a time when the carried gas attains substantially constant composition levels, obtaining a gas in said sorption zone as an enriched rejected component during the non-steady state condition, collecting said adsorbed component from said membrane in a desorption zone as an enriched component.

2. A method as in claim 1 wherein said gas permeable membrane system is an endless film so that a given point on said film is continuously recycled through respective sorption and desorption zones during said non-steady-state condition.

3. A method as in claim 1 wherein said gas permeable membrane system is a supported membrane sheet which reciprocates between adjoining sorption and desorption zones at predetermined velocities and pauses in the respective zones during said non-steady-state condition.

4. A method which includes the steps of claim 1 wherein said membrane is moved into a desorption zone, and wherein a point on said moved membrane is retained during movement in said desorption zone for a time sufficient for the component carried by said membrane to be substantially collected in said desorption zone as an enriched component.

* * * * *